United States Patent Office 3,515,562
Patented June 2, 1970

3,515,562
FROZEN CONFECTIONS CONTAINING GLYCEROL AND PROPYLENE GLYCOL MONOESTERS OF ISOSTEARIC ACID
Bert W. Landfried, Independence, Mo., and Harold J. Bassett, Prairie Village, and John R. Moneymaker, Overland Park, Kans., assignors to Top-Scor Products, Inc., Kansas City, Kans., a corporation of New York
No Drawing. Filed May 5, 1967, Ser. No. 636,543
Int. Cl. A23g 5/00
U.S. Cl. 99—136    5 Claims

ABSTRACT OF THE DISCLOSURE

Structurally modified saturated fatty acid having 18 carbons, and a titre below about 15° C. (isostearic acid) is esterified with a polyhydric alcohol, the ester having one or more free alcoholic hydroxyl groups on the alcohol component of the ester, and dispersed into an oil-in-water emulsion type frozen confection mix, producing improved surface dryness.

---

This invention relates to a process and additive for making improved frozen emulsion confections such as soft-serve ice milk, hard ice milk and ice cream.

Frozen lacteal confections manufactured by the usual commercial processes are homogenized oil-in-water emulsions including butterfat, milk solids-not-fat, sugar, flavoring material, a stabilizer system and an emulsifier system. Stabilizers such as sodium carboxymethyl cellulose and natural gums are used to facilitate improved consistency in texture in the finished product and to improve increased storage stability by inhibiting the growth of ice crystals. Emulsifiers serve to stabilize the emulsion before freezing, improve whipping ability, shorten the time required to introduce the desired amount of air and produce a smoother, dryer texture in the finished product. With modern processing equipment wherein air is incorporated during continuous freezing, the primary function of the emulsifier system is to provide surface dryness.

Dryness in frozen confections refers to the absence of a wet, soft or slack appearance and a product with a high degree of dryness also exhibits improved body, finer texture and slow, uniform melting characteristics. Many factors other than the emulsifier system affect dryness; for example, the type of processing equipment used, draw temperature and fat content, however, the proper use of an emulsifier system will consistently improve dryness.

Recent research has indicated that dryness is achieved by controlled agglomeration of the dispersed fat globules in the emulsion. Insufficient agglomeration produces a wet confection while excessive agglomeration results in a condition of coalesced fat particles known as churning. Emulsifiers currently in widespread use to control agglomeration are partial esters of glycerine with naturally occurring fatty acids (see Pat. No. 2,821,480 and references therein), similar reaction products using propylene glycol, polyoxyethylene (20) sorbitan mono oleate and related esters of this ethylene oxide derivative of sorbitan, notably the tristearate.

It is known that emulsifiers which are liquid at room temperature are most capable of providing desired dryness. Such liquid emulsifiers for foods are generally those prepared from unsaturated fatty acids. The esters of unsaturated fatty acids must be employed in frozen confection mixes at very low levels (about 0.05%) because overuse tends to upset agglomeration control which may result in churning. The unsaturated fatty acid derivitives have a further disadvantage in that they are more subject to rancidity which results in undesirable flavor changes. The normally solid emulsifiers, most commonly glycerol monostearate, are effective emulsion stabilizing agents but only fair drying agents and show no increased dryness when used beyond a level of about 0.3%.

Prior hereto, the emulsifier additives used in frozen confections generally constituted a compromise in the form of a powder made up, for example; by blending 80 parts by weight of higher melting point mono and diglycerides with 20 parts liquid polyoxyethylene (20) sorbitan mono oleate. Such combinations were designed, hopefully, to improve dryness without excessively reduced emulsion stability. High stability together with excellent dryness heretofore has not been achieved.

The powdered form taken by these emulsifiers presented another disadvantage in that it is difficult to weigh and is relatively slowly dispersed into the mix. A liquid emulsifier is much preferred since it more rapidly disperses and can be pumped and metered instead of weighed. This is particularly important in conjunction with modern, continuous, processing operations. Further, liquid emulsifiers can readily be mixed with stabilizers to form a homogeneous pumpable slurry which will lend itself to accurate, continuous metering and high speed dispersion.

It is therefore, the principal object of this invention to provide a frozen confection emulsifier system which produces high emulsion stability and whipping ability with excellent dryness; to provide such an emulsifier system which is a liquid at room temperature but resistant to rancidity; to provide a pumpable additive system including both stabilizers and emulsifiers which is easily adapted to continuous manufacturing methods; to provide frozen confections having smooth body, good storage stability, superior flavor characteristics and improved dryness; and to provide a method of making improved frozen confections.

Other objects and advantages of this invention will become apparent from the following description wherein is set forth by way of examples, certain embodiments of this invention.

U.S Pat. No. 2,812,342 issued Nov. 5, 1957 describes the modification of common fatty acids so as to produce saturated liquid acids having the chemical stability of the solid, saturated acids. It has now been discovered that the polyhydric esters of such modified fatty acids and, particularly, the esters of liquid isomers of stearic acid are highly functional emulsifier additives for the commercial preparation of frozen confections. Mixes which contain glycerol or propylene glycol esters of isostearic acid have been found to produce superior products showing excellent dryness, stiffness and stability along with improvements in flavor and texture. Blending or admixing with other emulsifiers has been found to be unnecessary to achieve these results.

Chemically, isostearic acid is a saturated fatty acid of the empirical formula $C_{17}H_{35}COOH$. Although available in commercial mixtures, the exact structure of this acid is not fully understood. Evidence indicates, however, that the isomers are of the methyl-branched series with quite small contamination of higher molecular weight branch chains. The titre or freezing point is much lower than is ordinarily encountered in saturated fatty acids of this molecular weight, for example; the commercially available types of isostearic acid have a titre below about 15° C. while pure stearic acid has a melting point of 69.6° C.

The emulsifiers of the present invention may be readily prepared using well-known methods of esterification. For example; the glycerol esters of isostearic acid (M.P. 10° C.) were produced by reacting at 250° C. equal molar quantities of anhydrous glycerol and isostearic acid using catalytic amounts of pure anhydrous caustic soda. The caustic was neutralized at 200° C. using a slight excess of 85% phosphoric acid following a 60 minute reaction with constant stirring and a continuous flow of dry nitrogen gas. The water of esterification was collected using a water cooled condenser. The resultant reaction mixture was a honey colored lipid liquid at room temperature which was found to contain 6.6% free glycerol and 44.3% glycerol mono isostearate.

The reaction mixture was found to be easily added to and highly functional in frozen confection mixes. Small amounts ranging generally from about 0.01 percent to about 0.3 percent by weight of the frozen confection mix was found to be most desirable.

The following examples will illustrate the preparation of frozen confections according to this invention and the benefits derived therefrom:

EXAMPLE 1

A typical formula for a soft serve ice cream product was used to compare various emulsifiers:

Formula

| Ingredients: | Parts by wt. |
|---|---|
| Butterfat | 4.00 |
| Milk solids, nonfat | 12.00 |
| Sucrose | 13.00 |
| Stabilizer | 0.40 |
| Emulsifier | Variable |
| Moisture, balance to total 100 | |

The stabilizer was a commercial mixture containing 37.0 percent carboxymethyl cellulose of medium viscosity, 6.0% carrageenin and 0.5% locust bean gum with the remaining portion being cerelose. Following makeup, the test mixes were vat pasteurized at 165° F. for 30 minutes, homogenized at 2500 p.s.i., cooled over a cold water surface type cooler to 42° F. and stored at 37° F. for 24 hours. A Model 5P Port Morris Electro Freeze soft serve freezer was used for freezing the stored mix.

Mix viscosity was measured immediately after makeup and again after storage at 37° F. for 24 hours using a Brookfield Viscometer. Lapsed time between freezer-on and automatic shut-off at 19° F. was recorded on each test mix. Freshly frozen mix was judged for dryness by rating with 1 for very dry, 2 for a state normally considered satisfactory, and 3 for definitely "wet" in appearance. All determinations were conducted in a controlled ambient temperature of 72° ±0.5° F. Results follow:

TABLE 1

| Emulsifier variables levels | Percent | Mix viscosity fresh (cps.) | Mix viscosity 24 hrs. (cps.) | Freezing time (minutes) | Dryness rating |
|---|---|---|---|---|---|
| None (control) | | 226 | 328 | 27 | 3 |
| Glycerol mono stearate (50% alpha) | 0.05 | 256 | 372 | 20 | 3 |
| Do | 0.10 | 238 | 338 | 18 | 2 |
| Do | 0.15 | 218 | 304 | 22 | 2 |
| Do | 0.20 | 264 | 358 | 20 | 2 |
| Do | 0.30 | 230 | 302 | 17 | 1 |
| Polyoxyethylene (20) sorbitan mono oleate | 0.05 | 200 | 278 | 12 | 2 |
| Do | 0.10 | 224 | 304 | 12 | 2 |
| Do | 0.15 | 214 | 298 | 12 | 1 |
| Do | 0.20 | 224 | 308 | 13 | 1 |
| Do | 0.30 | 218 | 306 | 13 | 1 |
| Propylene glycol mono isostearate (50%) | 0.05 | 232 | 310 | 15 | 2 |
| Do | 0.10 | 220 | 292 | 15 | 2 |
| Do | 0.15 | 212 | 282 | 12 | 2 |
| Do | 0.20 | 222 | 300 | 12 | 2 |
| Do | 0.30 | 242 | 326 | 12 | 1 |
| Glycerol mono isostearate (46.4% alpha) | 0.05 | 244 | 346 | 15 | 2 |
| Do | 0.10 | 232 | 314 | 14 | 2 |
| Do | 0.15 | 212 | 302 | 11 | 1 |
| Do | 0.20 | 202 | 308 | 13 | 1 |
| Do | 0.30 | 270 | 372 | 13 | 1[1] |
| Glycerol mono oleate (52.3% alpha) | 0.05 | 250 | 334 | 14 | 2 |
| Do | 0.10 | 228 | 312 | 14 | 2 |
| Do | 0.15 | 226 | 318 | 15 | 1 |
| Do | 0.20 | | | 14 | 1 |
| Do | 0.30 | | | 13 | 1 |

[1] Churned out, i.e., emulsion breakdown indication. Additive level excessive.

None of the five emulsifiers compared caused a substantial change in viscosity or storage characteristics of the mixes over the control mix. All of the emulsifiers demonstrated essentially the same effect on freezing time. The date, however, clearly shows that the agents of this invention function in a unique manner regarding rated dryness. Propylene glycol mono isostearate provided satisfactory or superior dryness over the entire range of levels tested, indicating unusual tolerance of usage. Glycerol mono isostearate was found to be the most effective drying agent tested, but 0.3% usage appeared to be excessive, producing churn-out.

EXAMPLE 2

The following formula was employed in the preparation of test batches of hard ice milk. The stabilizer and mix makeup procedures were the same as detailed in Example 1, except the freezer used was an Electro Freeze batch freezer. In this case freezing time was determined by measuring the time elapsed from the moment the freezer was turned on until the ice milk was ready to draw. The drawing point is a matter of judgment normally exercised to insure a uniform finished product.

Formula

| Ingredients: | Parts by wt. |
|---|---|
| Butterfat | 4.00 |
| Milk solids, nonfat | 13.00 |
| Sucrose | 15.00 |
| Stabilizer | 0.40 |
| Emulsifier | Variable |
| Moisture, balance to total 100. | |

The results follow:

TABLE II

| Emulsifier variables level | Percent | Freezing time (minutes) | Overrun (percent) | Dryness rating |
|---|---|---|---|---|
| None (control) | | 10 | 76 | 3 |
| Glycerol mono stearate (50% alpha) | 0.05 | 9 | 75 | 3 |
| Do | 0.10 | 9 | 72 | 2 |
| Do | 0.15 | 9 | 76 | 2 |
| Do | 0.20 | 9 | 74 | 1 |
| Do | 0.30 | 9 | 85 | 1 |
| Polyoxyethylene (20) sorbitan mono oleate | 0.05 | 9 | 90 | 2 |
| Do | 0.10 | 10 | 59 | 1 |
| Do | 0.15 | 9 | 45 | 1 |
| Do | 0.20 | 8 | 54 | 1 |
| Do | 0.30 | 8 | 54 | 1 |
| Propylene glycol mono isostearate (50%) | 0.05 | 10 | 59 | 1 |
| Do | 0.10 | 9 | 63 | 1 |
| Do | 0.15 | 9 | 64 | 1 |
| Do | 0.20 | 10 | 53 | ¹3 |
| Do | 0.30 | 8 | 51 | ¹3 |
| Glycerol mono isostearate (46.4% alpha) | 0.05 | 7 | 64 | 3 |
| Do | 0.10 | 8 | 65 | 2 |
| Do | 0.15 | 8 | 61 | 2 |
| Do | 0.20 | 8 | 56 | 2 |
| Do | 0.30 | 8 | 53 | 2 |
| Glycerol mono oleate (52.3% alpha) | 0.05 | 8 | 67 | 2 |
| Do | 0.10 | 8 | 60 | 2 |
| Do | 0.15 | 9 | 55 | 2 |
| Do | 0.20 | 8 | 56 | 2 |
| Do | 0.30 | 8 | 51 | 1 |

¹ Obvious usuage in excess of system requirements.

It was noted that none of the tested emulsifiers had any appreciable effect on mix viscosity or storage properties. The observed variation in freezing time was not considered significant. The overrun data indicated that the agents of the present invention do not function as expected for fully saturated monoglycerides but appear to act more like unsaturated monoglycerides in this respect.

The dryness ratings indicate that in ice milk propylene glycol isostearate is by far the most effective agent, providing excellent results at 0.05% usage (lowest level tested), excessive concentrations at 0.2% level and above producing churn-out. The glycerol mono isostearate produces a consistently satisfactory dryness over a wide range of usage, results which are similar to those expected with the unsaturated emulsifier glycerol mono oleate.

Following the evaluation of overrun and dryness, the ice milk samples were stored for one week at −10° F. prior to meltdown evaluations. Meltdown was measured by placing a three-ounce sample at −10° F. on a wire screen and measuring the time required for liquid separation to occur with ambient temperature at 72° F. The results show that ice milk containing the isostearic esters was superior to all the other test samples in its ability to resist bleeding.

EXAMPLE III

The following ice cream formulation was used in another series of test.

| Ingredients: | Parts by wt. |
|---|---|
| Butterfat | 10.00 |
| Milk solids, nonfat | 12.00 |
| Sucrose | 15.00 |
| Stabilizer | 0.35 |
| Emulsifier | Variable |
| Moisture, balance to total 100. | |

Mix make-up procedures and tests were the same as detailed in Example II. Discernible differences in effects on mix viscosity, freezing time or storage properties were not apparent.

TABLE III

| Emulsifier variables level | Percent | Freezing time (minutes) | Overrun (percent) | Dryness rating |
|---|---|---|---|---|
| None (control) | | 12 | 54 | 3 |
| Glycerol mono stearate (50% alpha) | 0.05 | 10 | 53 | 3 |
| Do | 0.10 | 9 | 61 | 2 |
| Do | 0.15 | 9 | 73 | 2 |
| Do | 0.20 | 9 | 76 | 1 |
| Do | 0.30 | 10 | 79 | 1 |
| Polyoxyethylene (20) sorbitan mono oleate | 0.05 | 10 | 61 | 1 |
| Do | 0.10 | 10 | 56 | 1 |
| Do | 0.15 | | 56 | 1 |
| Do | 0.20 | 8 | 53 | 1 |
| Do | 0.30 | 8 | 53 | ¹1 |
| Propylene glycol mono isostearate (50%) | 0.05 | 8 | 55 | 1 |
| Do | 0.10 | 8 | | 1 |
| Do | 0.15 | 8 | 50 | 1 |
| Do | 0.20 | 8 | 53 | 1 |
| Do | 0.30 | 8 | 51 | 1 |
| Glycerol mono isostearate (46.4% alpha) | 0.05 | 9 | 62 | 2 |
| Do | 0.10 | 9 | 55 | 2 |
| Do | 0.15 | 9 | 50 | 1 |
| Do | 0.20 | 8 | 69 | 1 |
| Do | 0.30 | 8 | 41 | ¹1 |
| Glycerol mono oleate (52.3% alpha) | 0.05 | 9 | 54 | 2 |
| Do | 0.10 | 8 | 59 | 2 |
| Do | 0.15 | 8 | 59 | 1 |
| Do | 0.20 | 8 | 62 | 1 |
| Do | 0.30 | 8 | 60 | 1 |

¹ Overuse obvious.

The effects on freezing time and overrun were similar to those found in Example II. The isostearic derivatives were again found to produce overrun effects more characteristic of the unsaturated glycerol mono oleate rather than glycerol monostearate.

Dryness effects in this formulation with propylene glycol isostearate are similar to those observed with polyoxyethylene (20) sorbitan mono oleate, showing excellent functionality and tolerance to usage level. The glycerol ester of isostearic acid functioned in a manner similar to glycerol mono oleate but was slightly more effective.

Using the method detailed in Example II, the ice cream samples were stored one week at −10° F. and then evaluated for meltdown stability at 72° F. Visible melting did not start on any sample during the first five minutes of the test. After ten minutes only the control sample and the samples containing 0.05% and 0.10% glycerol monostearate had begun to melt. In 15 minutes all levels of glycerol monostearate, polyoxyethylene (20) sorbitan mono oleate and propylene glycol mono isostearate were melting, but the samples containing the latter two emulsifiers proceeded noticeably more slowly. Only after thirty minutes did samples containing glycerol mono isostearate and glycerol mono oleate start to show visible indications of melting. This again demonstrated the function of the isostearic esters as similar to the unsaturated emulsifiers.

It is to be understood that, although certain forms of this invention have been disclosed herein, it is not to be limited except as set forth in the following claims.

What is claimed and desired to secure by Letters Patent is:

1. In the process of preparing oil-in-water emulsion type frozen confections including the steps of making up a mix and homogenizing and freezing the mix, the improvement which comprises:
   (a) adding to the mix prior to homogenization and freezing, in an amount sufficient to produce dryness, glycerol or propylene glycol mono esters of isomers of stearic acid characterized as having a titre below about 15° C.

2. The process set forth in claim 1 wherein said esters are added in an amount ranging from about .01% to about 0.30% by weight of the mix.

3. The process as set forth in claim 1 wherein said mix includes a stabilizer and (a) said stabilizer is mixed with said esters forming a pumpable slurry for addition to said mix.

4. A mix suitable for homogenization and freezing to form an oil-in-water emulsion type frozen confection comprising butterfat, milk solids nonfat, a sugar and
   (a) an emulsifier consisting essentially of glycerol or propylene glycol mono esters of isostearic acid having a titre below about 15° C., said emulsifier being included in an amount sufficient to produce dryness.

5. The mix as set forth in claim 4 wherein:
   (a) said glycerol mono esters are alpha mono esters.

References Cited

UNITED STATES PATENTS 2,812,342  11/1957  Peters _____ 260—407
3,124,464  3/1964  Knightly et al. _____ 99—136

MAURICE W. GREENSTEIN, Primary Examiner

J. M. HUNTER, Assistant Examiner